(12) United States Patent
Erpelding

(10) Patent No.: US 7,038,885 B2
(45) Date of Patent: May 2, 2006

(54) BALANCED AND DAMPED SUSPENSION FOR USE IN A DISK DRIVE

(75) Inventor: A. David Erpelding, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 11/070,427

(22) Filed: Mar. 2, 2005

(65) Prior Publication Data

US 2005/0174694 A1 Aug. 11, 2005

Related U.S. Application Data

(62) Division of application No. 09/939,074, filed on Aug. 24, 2001.

(51) Int. Cl.
*G11B 5/48* (2006.01)
(52) U.S. Cl. ...................................................... 360/244
(58) Field of Classification Search ................. None
See application file for complete search history.

(56) References Cited

U.S. PATENT DOCUMENTS

| | | | |
|---|---|---|---|
| 4,739,430 A * | 4/1988 | Manzke et al. ........... 360/264.3 |
| 4,760,478 A | 7/1988 | Pal et al. |
| 5,065,268 A | 11/1991 | Hagen |
| 5,187,625 A * | 2/1993 | Blaeser et al. ........... 360/244.3 |
| 5,299,081 A * | 3/1994 | Hatch et al. .............. 360/244.2 |
| 5,535,074 A * | 7/1996 | Leung ....................... 360/265.9 |
| 5,657,187 A | 8/1997 | Hatch et al. |
| 5,734,524 A * | 3/1998 | Ruiz ............................ 360/234 |
| 5,850,319 A | 12/1998 | Tangren |
| 5,894,381 A | 4/1999 | Allen et al. |
| 6,014,289 A * | 1/2000 | Goss ......................... 360/244.1 |
| 6,046,884 A | 4/2000 | Crane |
| 6,104,572 A | 8/2000 | Williams et al. |
| 6,108,171 A | 8/2000 | Coon et al. |
| 6,141,187 A | 10/2000 | Wong et al. |
| 6,151,197 A * | 11/2000 | Larson et al. ................ 360/255 |
| 6,246,546 B1 * | 6/2001 | Tangren ................... 360/245.1 |
| 2002/0080532 A1 | 6/2002 | Fujiwara et al. |
| 2002/0186508 A1 | 12/2002 | Kube et al. |

FOREIGN PATENT DOCUMENTS

DE    EP000617411 A2    9/1994

* cited by examiner

*Primary Examiner*—Angel Castro
*Assistant Examiner*—Mark Blouin
(74) *Attorney, Agent, or Firm*—Bracewell & Giuliani LLP

(57) ABSTRACT

A suspension for use in a disk drive is disclosed. The suspension has a hinge and load beam which are separately formed and subsequently joined together. The load beam is formed from a material which has improved damping characteristics. The load beam additionally has ribs constructed in order to balance the mass of the suspension about the torsional rotation axis. The location of the torsional rotation axis can be designed to intersect the head gimbal pivot point.

17 Claims, 10 Drawing Sheets

Prior Art

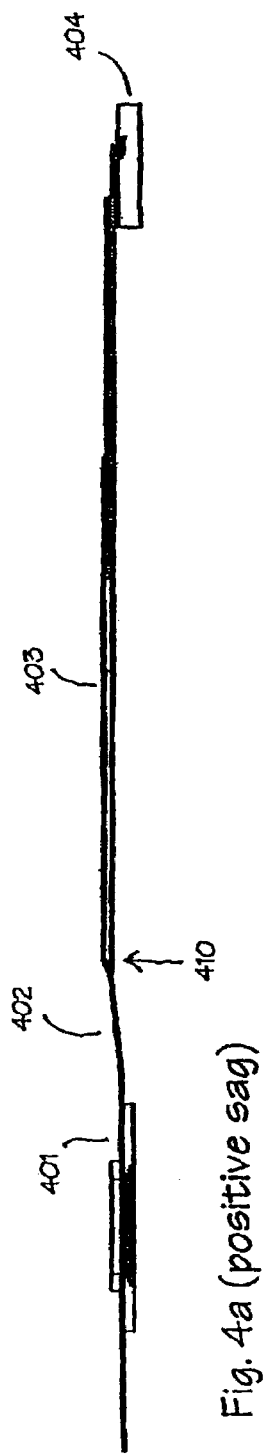
Fig. 4a (positive sag)
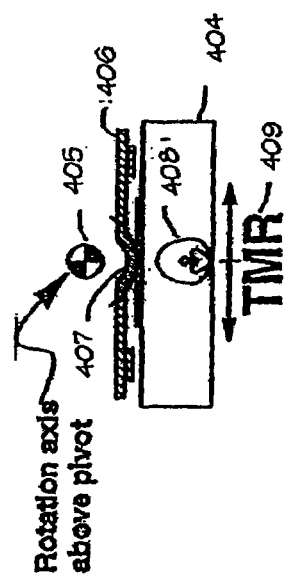
Fig. 4b (positive sag)

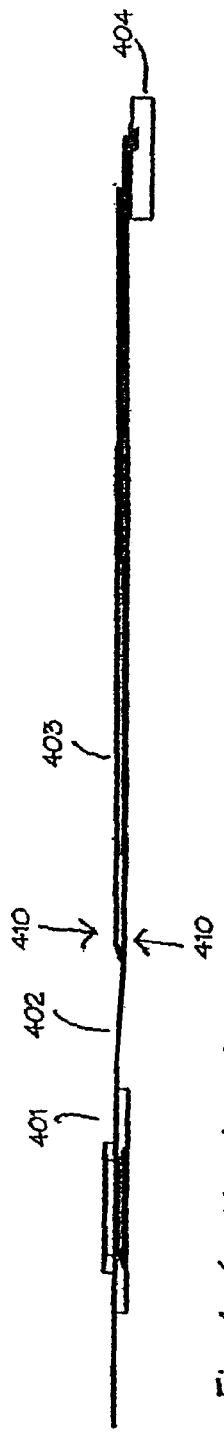
Fig. 4c (optimal sag)
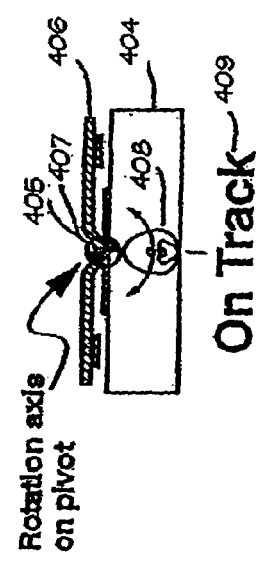
Fig. 4d (optimal sag)

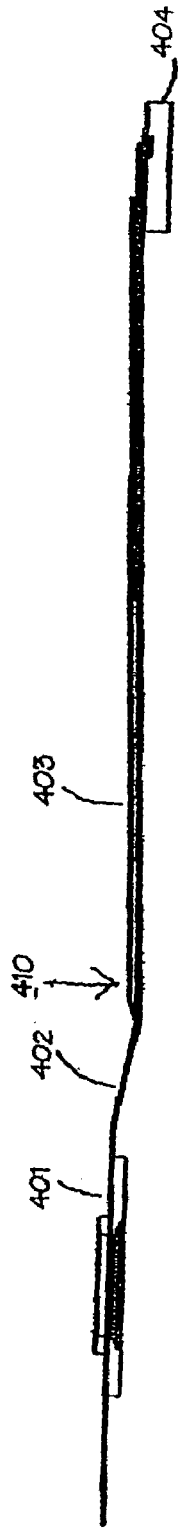
Fig. 4e (negative sag)
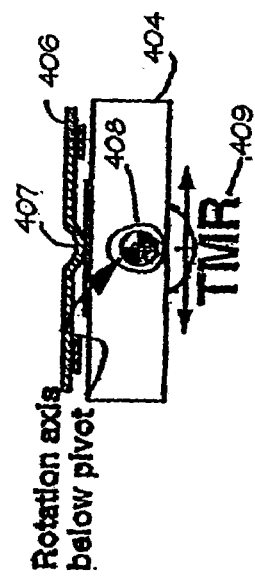
Fig. 4f (negative sag)

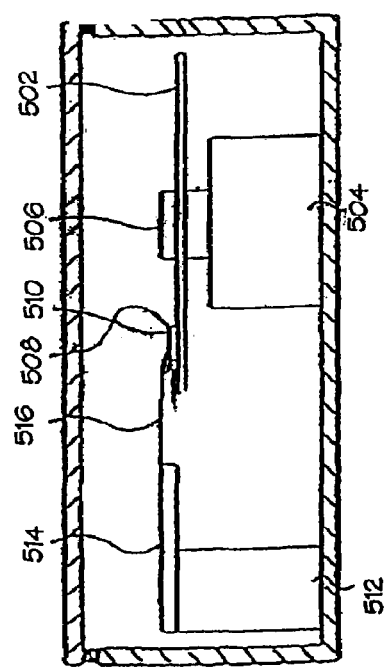
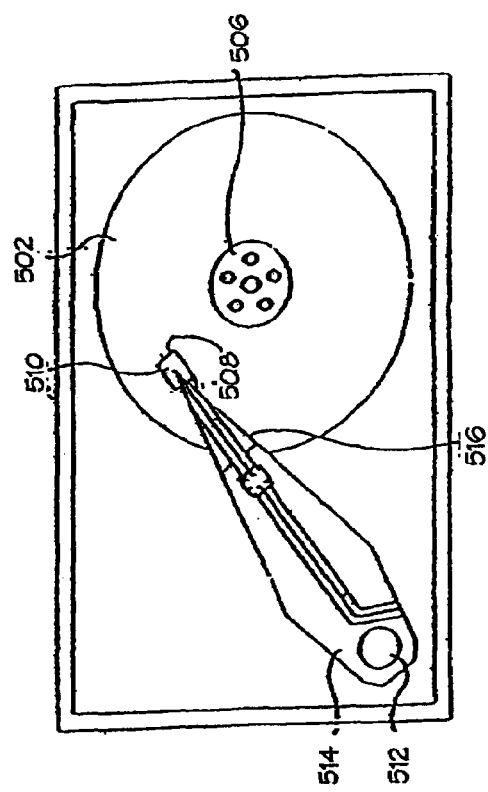
Fig. 5a
Fig. 5b

BALANCED AND DAMPED SUSPENSION FOR USE IN A DISK DRIVE

RELATED APPLICATIONS

This Divisional Application claims the priority of Parent application Ser. No. 09/939,074, filed on Aug. 24, 2001, and entitled "Balanced and Damped Suspension for Use in a Disk Drive."

BACKGROUND OF THE INVENTION

1. Field of the Invention

This invention relates generally to magnetic disk drive technology, and more specifically to a suspension for use in a data storage disk drive.

2. Description of the Background Art

Disk drives are used for nonvolatile memory storage in computer systems. Disk drives have at least one magnetic recording head mounted on a slider. An actuator positions the slider over a magnetic disk for writing and reading information on the disk. The mechanism which connects the slider to the actuator is called a suspension. Conventional suspensions have several shortcomings including poor damping characteristics and other characteristics which contribute to increased track misregistration (TMR) as discussed in detail below. The present invention is a suspension which has superior damping characteristics and optimized TMR performance.

Some of the features of conventional suspensions are illustrated in FIGS. 1a and b. Most suspensions have a mounting plate 102 having a hole 104 with a raised lip (not shown) for swaging into a rigid arm. The suspension has a hinged portion 106 and a rigid load beam portion 108. The hinge portion 106 imparts a spring action to the load beam 108 which forces the slider toward the disk. Each load beam has an associated head gimbal pivot point. There are at least two head gimbal structures used in suspensions which differ in the slider attachment to the suspension. The location of the head gimbal pivot point depends on which of these structures is used. For the structure illustrated in FIGS. 1a and b, the slider 110 is attached to a flexure 112 forming a head gimbal which is also called a slider gimbal. In this structure, there is a dimple (not shown) usually formed on the load beam which serves as the pivot point for the head gimbal. The dimple may also be formed on a flexure member which is attached directly to the load beam. The location of the dimple establishes the head gimbal pivot point relative to the load beam. Another type of suspension does not use a dimple to define the head gimbal pivot point and is known as a dimpleless design. This design is taught in U.S. Pat. No. 5,198,945 and U.S. Pat. No. 5,912,788. Referring to FIG. 2, the pivot point for the head gimbal is the intersection of a torsional axis 32 of the flexure and a pitch axis 30. FIG. 3 shows how the head gimbal is constructed to include a load beam.

Referring to FIGS. 1a and 1b, a suspension generally has a torsional vibration mode which rotates about a torsional axis 114. To provide stiffness to the load beam 108 a portion of each of the outside edges 118 is bent out of the plane of the load beam to form a flange 116 as shown in FIG. 1a. Most commonly the flanges are bent away from the disk, but they can also be bent toward the disk. The flat portion 120 of the load beam between the flanges 116 defines the plane of the load beam. In conventional suspensions the load beam 108 and the hinge portion 106 are formed from the same continuous sheet of material. The forming process for hinge portion 106, which produces spring action, alters the relative position of the load beam portion 108 to the mounting plate 102. Two parameters of this relative position are sag and formed area flatness (FAF), which are described in detail below.

An important index of the performance of a disk drive is track misregistration (TMR). Track misregistration is a measure of the distance from the recording head to the center of the desired track on the disk and represents an undesired misalignment of the head with respect to the center of the track. As the offset of the torsional axis of the suspension increases relative to the pivot point of the slider gimbal the TMR also increases. This is because the offset of the torsional axis to the pivot point of the slider acts as a lever for lateral slider motion. This lateral motion contributes directly to TMR.

As illustrated in FIGS. 4a, c, and e (in which the vertical scale is exaggerated), sag is shown as the location or offset of the flat portion of the load beam 403 with respect to the mounting plate 401. The amount of sag in a conventional suspension determines the degree to which the torsional axis is misaligned with the pivot point of the slider gimbal. FIG. 4a shows a side view of a suspension with positive sag 410. FIG. 4a includes a view of the mounting plate 401, the hinge portion 402, the load beam portion 403, and the slider 404. A positive sag exists when the gimbal pivot point of a suspension is closer to the disk than the axis of torsional rotation. FIG. 4b shows an end view of the load beam 406, the slider 404 and the pivot point 407 for the case of positive sag. Because of positive sag, the torsional axis 405 is above the slider gimbal pivot point 407 which results in additional movement of the recording head 408 and increased TMR 409. FIG. 4c shows a case of optimal sag 410 wherein the torsional axis intersects the gimbal pivot point. This results in minimal TMR 409 and good disk drive performance. In FIG. 4c, the mounting plate 401, hinge portion 402, load beam 403, and slider 404 are similar as in FIG. 4a. In FIG. 4d it is shown that at optimal sag the torsional axis 405 intersects the pivot point 407. FIG. 4e illustrates negative sag 410. FIG. 4f illustrates that for negative sag the torsional axis 405 is below the pivot point 407 resulting in greater movement of the recording head 408 and increased TMR 409.

The distance between the torsional axis and the pivot point acts as a lever arm. Since the slider is constrained by the presence of the disk from rotating as it flies on the disk surface, this lever transfers the torsional motion of the load beam as linear motion to the slider. This linear motion is perpendicular to the direction of the recorded track. This sideway linear motion of the slider relates directly to TMR because the recording head attached to the slider moves away from the center of the track. Therefore, from FIGS. 4a, b, c, d, e, and f, it can be seen that the farther the torsional axis is away from the pivot point the greater the effect on TMR. Therefore, it is desirable to keep the distance between the torsional axis and the pivot point which acts as a lever arm as small as possible to minimize TMR.

Another parameter of the suspension which must be controlled is the Formed Area Flatness (FAF). Referring to FIGS. 1a and 1b, FAF is defined as the coplanarity of the flat portion 120 of the load beam with respect to the mounting plate 102. In other words, FAF is a measurement of the angular tilt of the flat portion 120 of the load beam using the mounting plate as a reference surface. FAF and sag are interdependent in conventional suspensions which have the same continuous material used for forming both the hinge and the load beam. Generally a conventional suspension with optimized FAF will have sub optimum sag and conversely a suspension with optimized sag will have sub optimal FAF. FAF primarily controls how much power, or gain, is in the torsional vibrations of the suspension whereas sag primarily controls the effect of torsional vibrations on TMR. The effects of both FAF and sag are important factors in the dynamic performance of the suspension.

What is needed is a suspension in which the sag can be controlled independently from FAF and the hinge forming process. For the torsional vibrations that do occur, it is desired to have the gain of those vibrations substantially reduced by the damping characteristics of the suspension.

SUMMARY OF THE INVENTION

One aspect of the present invention provides for a suspension in which the sag is independent from FAF. This is accomplished by fabricating the load beam separately from the hinge. Another aspect of the invention is to provide for a load beam constructed from a material which has greatly improved vibration damping characteristics. A suspension embodying the invention has improved damping. A disk drive using a suspension embodying the invention has improved TMR performance.

In one embodiment, the suspension has a hinge and a load beam fabricated separately and subsequently joined together. The load beam has an associated head gimbal pivot point. The load beam also has a torsional axis which passes approximately though the pivot point. The load beam has one or more ribs formed such that the distribution of mass of the ribs when combined with the distribution of mass of other portions of the load beam result in the balance of the total mass about the torsional axis. By separately forming the load beam and the hinge portion, the load beam can be formed from a material with superior damping characteristics without compromising the spring action of the hinge.

In another embodiment of the invention, a disk drive is fabricated using a suspension with a load beam and a hinge fabricated separately. In this embodiment a disk drive thus constructed has improved track misregistration.

Briefly and in general terms a suspension according to a preferred embodiment of the invention has a hinge and a load beam fabricated separately. This allows FAF to be adjusted at the time of fabricating the hinge without affecting sag. In addition the load beam can be formed from a material with superior damping characteristics. Other aspects and advantages of the present invention will become apparent from the following detailed description which taken in conjunction with the drawings illustrate by example the principles of the invention

BRIEF DESCRIPTION OF THE DRAWINGS

FIG. 4a shows a side view of a suspension which has positive sag;

FIG. 4b shows an end view of a suspension which has positive sag;

FIG. 4c shows a side view of a suspension which has optimum sag.

FIG. 4d shows an end view of a suspension which has optimum sag;

FIG. 4e shows a side view of a suspension which has negative sag;

FIG. 4f shows an end view of a suspension which has negative sag;

FIG. 5a shows a cross sectional drawing of a disk drive;

FIG. 5b shows a top down drawing of a disk drive;

DETAILED DESCRIPTION OF THE INVENTION

Figure 1A:
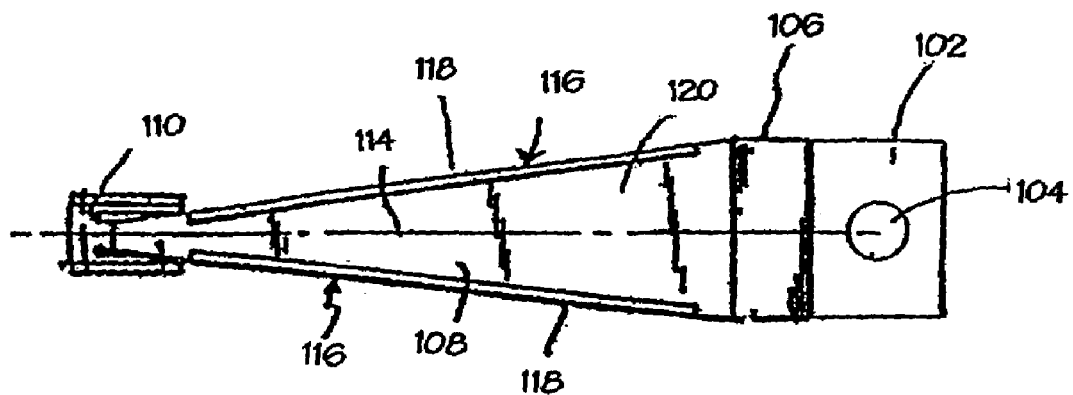
FIG. 1a shows a drawing of the top side of a prior art suspension.
Figure 1B:
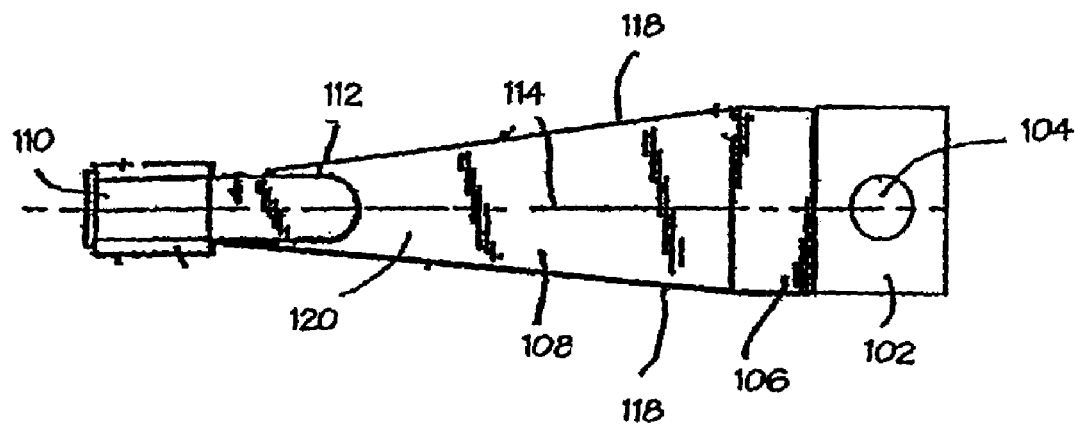
FIG. 1b shows a drawing of the bottom side (adjacent to the disk) of a prior art suspension.
Figure 3:
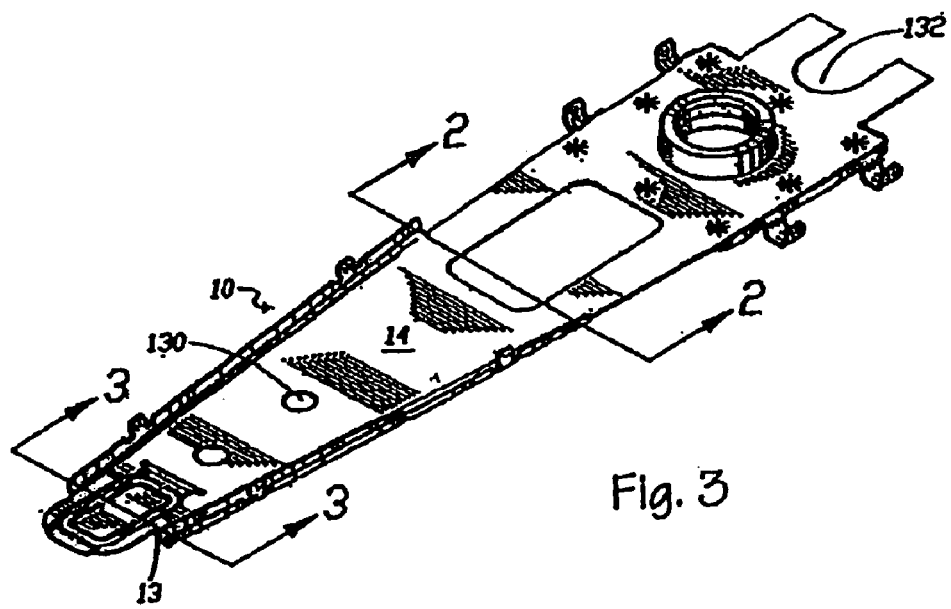
FIG. 3 shows a dimpleless head gimbal apparatus.
Figure 2:
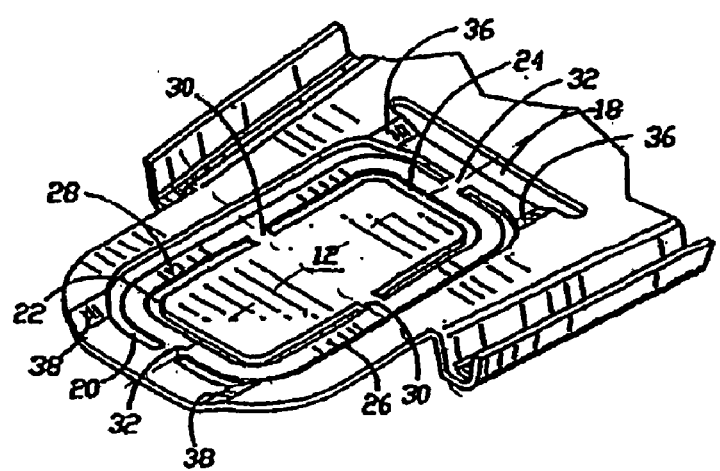
FIG. 2 shows details of a dimpleless suspension.

In one embodiment of the present invention the load beam and the hinge are fabricated separately and subsequently joined together. This allows the FAF to be controlled with the hinge forming process separately from sag. In another embodiment the load beam is formed from a material which is more efficient at damping vibrations. In addition the load beam can have ribs or other features formed to balance the mass about the desired location of the torsional axis. This enables the location of the torsional axis to be placed to approximately intersect the pivot point and thus minimize TMR. In previous suspensions the load beam and the hinge were generally formed from one continuous sheet of material. The material was thus selected for the spring properties required for the hinge. These materials, typically a stainless steel, generally have limited vibration damping characteristics. In previous suspensions the FAF could not be controlled without affecting the sag.

FIGS. 5a and b illustrate some of the components of a disk drive used for magnetically storing digital data. One or more magnetic disks 502 with recording surfaces are connected with hub 506 and drive motor 504. The motor 504 rotates the disks during normal drive operation. Some disk drives are designed such that the slider 510 comes to rest on the disk when the disk drive is stopped. In other disk drives, the slider is lifted off the disk surface when the disk drive is turned off. The embodiments of this invention apply to both load/unload and start/stop applications.

A magnetic recording head assembly 508 is formed on the trailing surface of a slider 510 and is used for reading and writing digital data on the recording surface of the disk. The recording head assembly usually comprises a separate write element along with a separate read element. The slider 510 is connected to an actuator 512 by means of a rigid arm 514 and a suspension 516. The suspension 516 provides a force which pushes the slider toward the surface of the recording disk 502.

Figure 6:
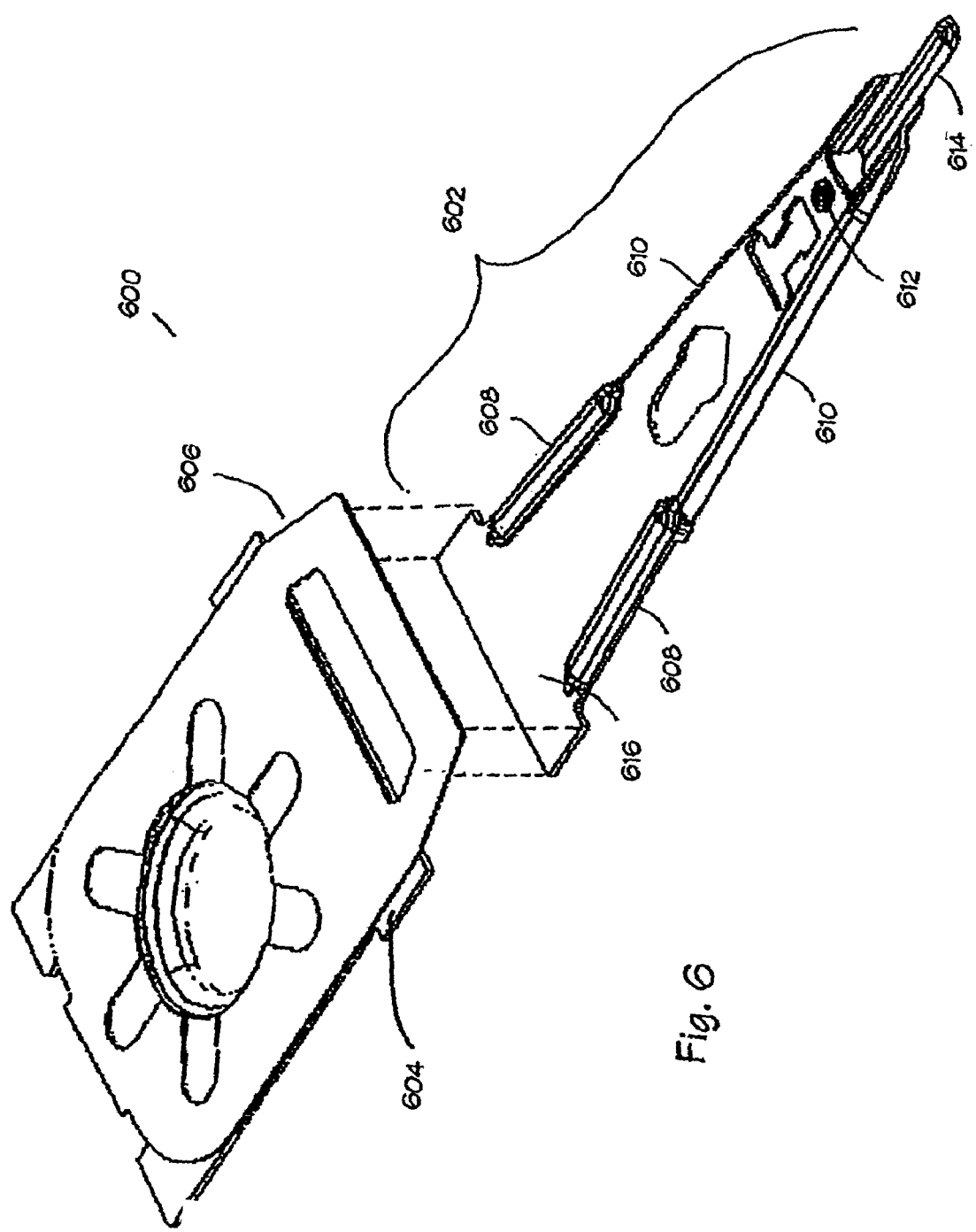
FIG. 6 illustrates an embodiment of the present invention.

FIG. 6 shows a perspective view of a mounting plate and load beam combination 600 according to an embodiment of the present invention. The mounting plate 604 is attached to the hinge portion 606. The hinge portion 606 is formed as a separate member. After fabrication, the hinge portion 606 and the load beam 602 are joined as indicated in the exploded view in FIG. 6. Flanges and ribs formed on the load beam increase the rigidity of the load beam so that the spring force of the hinge can be more efficiently transferred to the pivot point 612. Rigidity can also be increased by increasing the thickness of the load beam material; however, this has the disadvantage of increasing the mass of the load beam. By appropriately selecting the height, location, and size of flanges and ribs, the mass of the load beam can be distributed equally and in a balanced manner about the desired torsional axis of the suspension.

Depicted in FIG. 6 is a load beam 602 which has flanges 610 formed in a portion of the outside edges. There are also one or more portions of the outside edges of the load beam which are formed into ribs 608. Shapes other than flanges and ribs can be formed to achieve similar results of stiffening and balanced mass distribution. An alternative embodiment is to place one rib in the central portion of the load beam. It is also possible to add additional material to form the ribs. Although this would accomplish the purpose of balancing the mass, the total mass would disadvantageously increase.

For a suspension which has flanges 610 formed toward the disk, the ribs 608 generally extend above the plane 616 of the load beam 602 and away from the disk. Conversely, for a suspension which has flanges 610 formed away from the disk, the ribs 608 generally extend blow the plane 616 of the load beam 602 and toward the disk. Preferentially the load beam has a dimple 612 which applies a load or force to the slider, urging the slider towards the disk. However the dimple could also be formed on a separate member and attached to the load beam. A dimpleless suspension may also be used. The load beam has an optional load/unload tab 614 if the suspension is to be used in a load/unload application.

Figure 7:
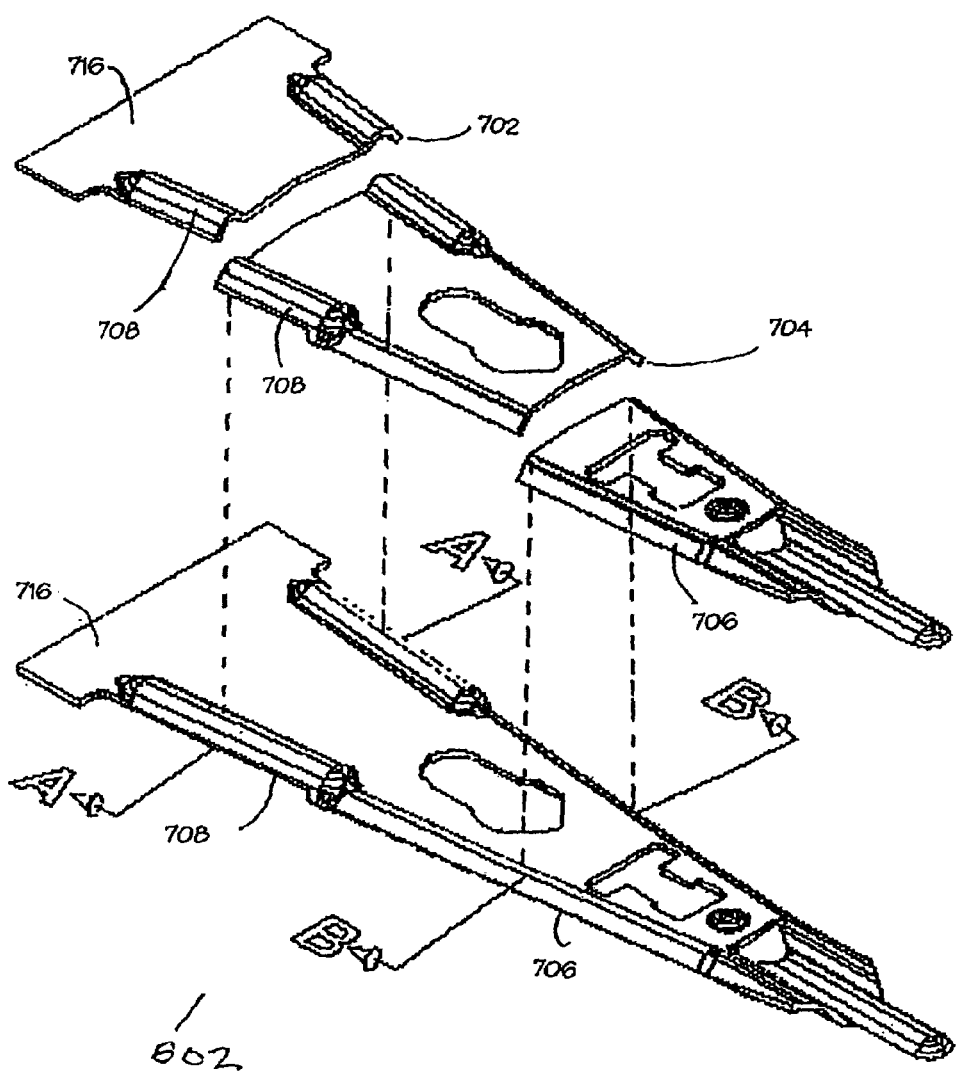
FIG. 7 shows the cross section profiles of the load beam features including the mass balancing ribs.

A view of one embodiment of a load beam 602 is shown in FIG. 7. As indicated in FIG. 7, a cross section 702 through the ribs indicated by the A—A line is shown. Also a cross section 704 through the flanges as indicated by the B—B line is shown. In the embodiment shown in FIG. 7, the distribution of mass from the flanges 706 is predominately downward and the distribution of mass from the ribs 708 is predominately upward relative to the plane of the suspension 716. If the ribs were not present, the torsional axis would pass above the pivot point as exemplified in FIGS. 4a and b. By constructing ribs, the position of the torsional axis is shifted upward toward the pivot point. A combination of the height, length, and width of the ribs are chosen so that the torsional axis passes through or in close proximity to the pivot point.

Figure 8A:
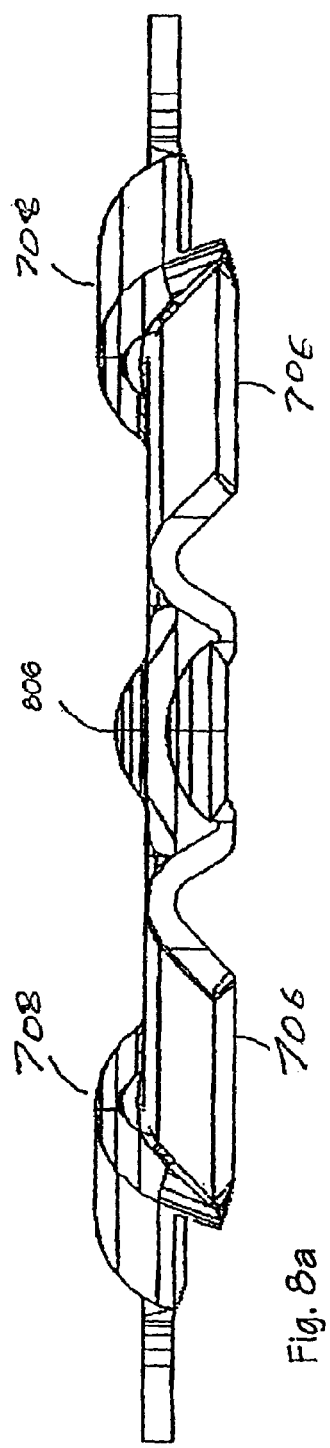
FIGS. 8a shows an end view of one embodiment of the load beam features.
Figure 8B:
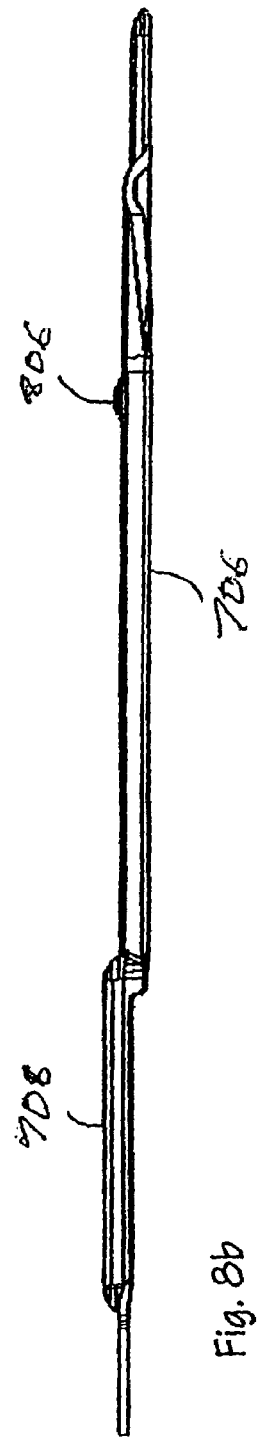
FIGS. 8b shows a side view of one embodiment of the load beam features.

The preferred construction of the ribs 708 and flanges 706 is shown in the end view presented in FIG. 8a. The embodiment of the suspension shown in FIGS. 8a and b has a dimple 806 to define the slider pivot point. However a dimpleless suspension can also be utilized. For reference, a side view of the suspension in FIG. 8a is shown in FIG. 8b.

Figure 9:
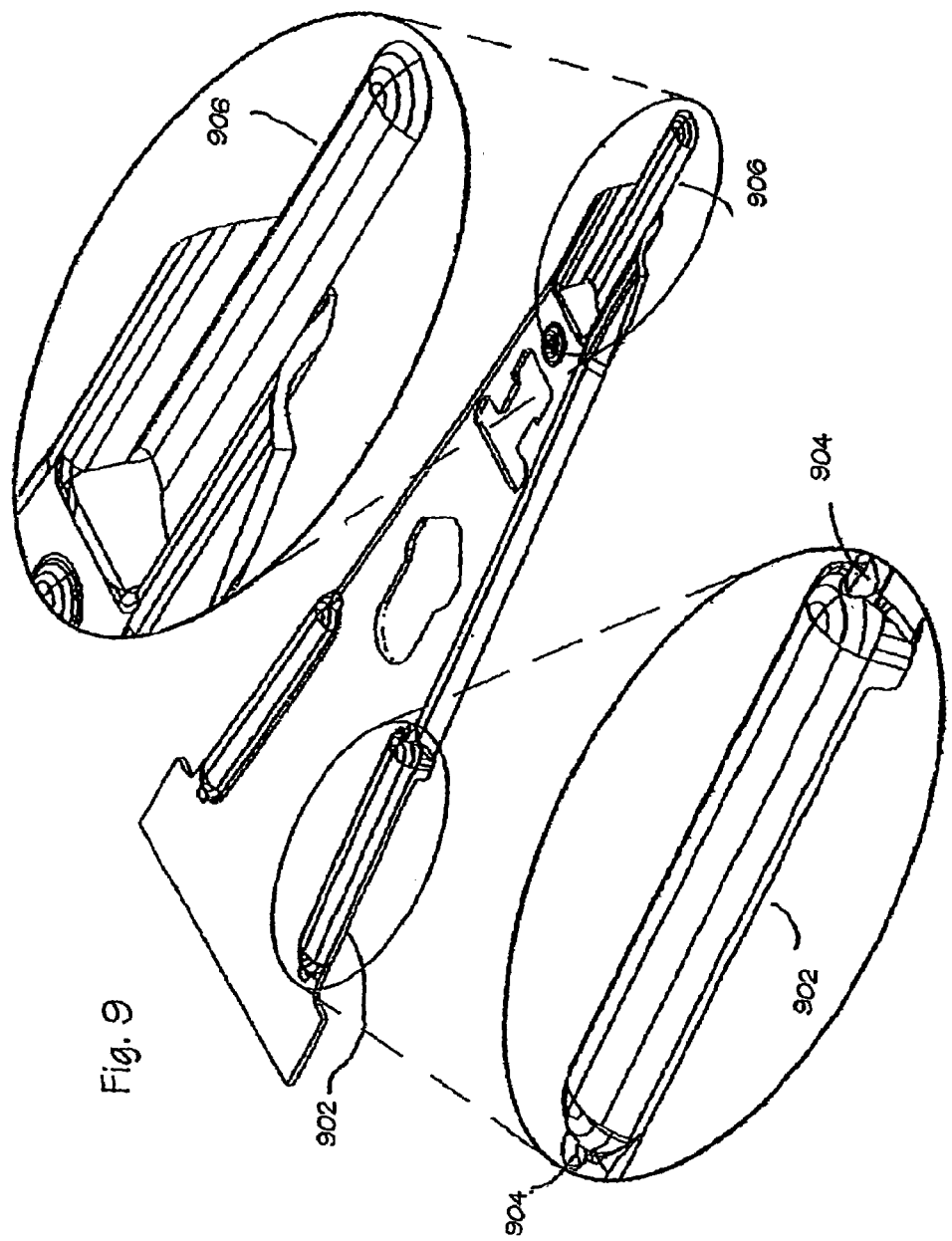
FIG. 9 shows a detailed view of the mass balancing ribs.

FIG. 9 also shows details of shape and structure of the ribs 902 according to an embodiment of the present invention. Two small optional holes 904 have been added at each end of each rib for stress relief of the material during the forming process. An expanded view of the lift tab 906 of this suspension is also shown. Although the primary purpose of the ribs is for balancing the mass of the suspension, a secondary use can be for assisting with assembly into the drive. The ribs can be used as contact surfaces for tooling that will hold adjacent head pairs apart as they are inserted between disk surfaces.

As discussed earlier, conventional suspensions use the same contiguous material for both the hinge portion and the load beam portion. It is a requirement that the hinge portion have a spring action which urges the load beam toward the disk surface. Consequently the material in most common use is chosen for the spring characteristics and is usually a stainless steel, such as stainless 301 or 302, for the contiguous hinge and load beam. However stainless steel is not efficient at damping vibrations compared with other materials. In accordance with the present invention the load beam is made of another material since it is formed separately from the hinge portion. Using a non-spring material for the load beam chosen to enhance vibration damping thus results in enhancements to suspension performance. Accordingly, a load beam can be constructed that is lighter, stiffer and in particular has improved damping characteristics compared with a conventional load beam constructed with spring material. Suitable materials may be selected from metals, plastics, or ceramics for the load beam. The preferred material is magnesium or a magnesium rich alloy. Magnesium is known for its intrinsic damping properties and has the added benefit of being less than half as dense as stainless steel. A magnesium or magnesium alloy load beam can be attached to the hinge by several methods. Some of these methods include, but are not limited to, adhesive bonding, diffusion bonding, or a pretreatment of the surface which enables welding. The preferred attachment method is a pretreatment of the magnesium surface with a nickel layer which allows for conventional welding. A nickel layer also increases the stiffness of the magnesium load beam. Using known techniques to apply nickel on magnesium or magnesium alloy results in a suspension that is stiffer than a conventional suspension made of stainless steel. A load beam with a magnesium core and a nickel outer skin is not only stiffer but is also lighter, and has better damping than a convention stainless steel load beam of equivalent thickness. Also by constructing an outer skin of nickel to the appropriate thickness, the coefficient of thermal expansion of the load beam is matched to that of the attached steel hinge.

An alternate embodiment of this invention is to form a load beam from a sheet of a constrained layer damping material. A sheet of constrained layer damping material is a sandwich of a viscoelastic material disposed between two sheets of metal. A typical configuration is a layer of viscoelastic material similar to that supplied by 3M under the product name Damping Polymer 242F01. A typical thickness of the viscoelastic material is 0.001 inch. This viscoelastic material is sandwiched between two sheets of 301 or 302 stainless steel. The thickness of the stainless steel depends on the desired stiffness and mass. For typical applications the stainless steel thickness is approximately 0.0015 inch. The entire load beam is constructed from this constrained layer damping material. This laminated material is die cut and formed into a load beam by conventional stamping and forming techniques. An advantage of this embodiment is that the entire load beam is constructed from the constrained layer damping material. A disadvantage of this embodiment is that the load beam stiffness will be less than a conventional all stainless steel load beam of equivalent thickness. Stiffness can be regained if a stiffer material is substituted for the outer two sheets of stainless steel. Such stiffer material can be a metal such as nickel, beryllium, rhodium or tungsten. If the load beam does not require a plastic forming procedure (such as stamping or pinching) then ceramic materials such as silicon, alumina, or zirconia may be used.

The embodiments of the present invention described in detail above have several advantages. One is that by separating the hinge portion from the load beam portion the sag and FAF can be independently controlled. This design independence allows the mass distribution to be altered by placing ribs on the load beam such that the center of torsional vibrations pass through the gimbal pivot point. This results in a reduction of TMR in a disk drive. Another advantage of a suspension according to the present invention is that the load beam can be formed from a material with much better vibration damping characteristics. While the invention has been shown and described with respect to preferred embodiments thereof, it will be understood by those skilled in the art that changes in form and detail may be made in these embodiments without departing from the scope and teaching of the invention. Accordingly, the embodiments herein disclosed is to be considered merely as illustrative, and the invention is to be limited only as specified in the claims.

I claim:

1. A suspension for use in a disk drive having a media disk, comprising:
   a hinge;
   a load beam attached to the hinge and having a center and outer edges that are laterally spaced apart from the center;
   at least one flange formed on the load beam comprising a bent portion of the load beam having a flange cross-sectional shape;
   at least one rib formed on the load beam having a rib cross-sectional shape that differs from the flange cross-sectional shape, such that said at least one rib is different in structural form than and spaced apart from said at least one flange; and wherein
   said at least one flange and said at least one rib are inverted relative to each other such that said at least one flange is formed toward the media disk and said at least one rib is formed away from the media disk.

2. A suspension according to claim 1, wherein said at least one flange comprises a plurality of flanges and said at least one rib comprises a plurality of ribs, and both pluralities of the flanges and ribs are formed on the outer edges of the load beam.

3. A suspension according to claim 1, wherein said at least one rib is formed in the center of the load beam.

4. A suspension according to claim 1, wherein said at least one rib has ends, and further comprising a hole formed in the load beam at at least one of the ends of said at least one rib for stress relief of a material used to form the load beam.

5. A suspension according to claim 4, a hole at each end of said at least one rib to define a plurality of holes in the load beam.

6. A suspension according to claim 1, wherein a material used to form the load beam is selected from the group consisting of metals, plastics, and ceramics.

7. A suspension according to claim 1, wherein a material used to form the load beam is selected from the group consisting of magnesium and magnesium rich alloys, and wherein the load beam is attached to the hinge by a method selected from the group consisting of adhesive bonding, diffusion bonding, and welding.

8. A suspension according to claim 7, wherein the load beam is welded to the hinge via pretreatment thereof with nickel to stiffen the load beam, reduce a weight of the load beam, and match a coefficient of thermal expansion of the load beam relative to conventional stainless steel load beams.

9. A suspension according to claim 1, wherein the load beam is formed from a constrained layer damping material having two outer sheets of material selected from the group consisting of nickel, beryllium, rhodium, tungsten, and ceramics.

10. A disk drive, comprising:
    a media disk having a recording surface;
    a motor connected to the media disk for rotating the media disk;
    an actuator for moving a slider relative to the recording surface;
    a head mounted to the slider for recording data on the recording surface;
    a suspension extending from the actuator to the slider, the suspension having a hinge, a load beam having outer edges, the hinge and load beam being formed separately and joined together, the load beam having a center and outer edges that are laterally spaced apart from the center;
    at least one flange formed on the load beam comprising a bent portion of the load beam having a flange cross-sectional shape;
    at least one rib formed on the load beam having a rib cross-sectional shape that differs from the flange cross-sectional shape, such that said at least one rib is different in structural form than and spaced apart from said at least one flange; wherein
    a material used to form the load beam is selected from the group consisting of magnesium and magnesium rich alloys, and wherein the load beam is attached to the hinge by a method selected from the group consisting of adhesive bonding, diffusion bonding, and welding; and wherein
    the load beam is welded to the hinge via pretreatment thereof with nickel to stiffen the load beam, reduce a weight of the load beam, and match a coefficient of thermal expansion of the load beam relative to conventional stainless steel load beams.

11. A disk drive according to claim 10, wherein said at least one flange comprises a plurality of flanges and said at least one rib comprises a plurality of ribs, and both pluralities of the flanges and ribs are formed on the outer edges of the load beam.

12. A disk drive according to claim 10, wherein said at least one rib is formed in the center of the load beam.

13. A disk drive according to claim 10, wherein said at least one flange and said at least one rib are inverted relative to each other such that said at least one flange is formed toward the media disk and said at least one rib is formed away from the media disk.

14. A disk drive according to claim 10, wherein said at least one rib has ends, and further comprising a hole formed in the load beam at at least one of the ends of said at least one rib for stress relief of a material used to form the load beam.

15. A disk drive according to claim 14, a hole at each end of said at least one rib to define a plurality of holes in the load beam.

16. A disk drive according to claim 10, wherein a material used to form the load beam is selected from the group consisting of metals, plastics, and ceramics.

17. A disk drive according to claim 10, wherein the load beam is formed from a constrained layer damping material having two outer sheets of material selected from the group consisting of nickel, beryllium, rhodium, tungsten, and ceramics.

* * * * *